3,359,067
METHOD FOR THE RECOVERY OF CALCIUM PHOSPHATES FROM HIGH LIME CONTENT PHOSPHATE ORES
Angus V. Henrickson, Golden, and Enzo L. Coltrinari, Arvada, Colo., assignors, by mesne assignments, to Susquehanna Western, Inc., Denver, Colo., a corporation of Wisconsin
No Drawing. Filed Dec. 17, 1962, Ser. No. 244,930
11 Claims. (Cl. 23—109)

This invention relates to a method for the recovery of usable phosphates from high lime content phosphate ores. More particularly, the invention relates to such a method in which the phosphates in the ore are brought into solution in the leaching step by the use of sulfurous acid.

One method for the production of usable phosphates from phosphate rock involves the use of sulfuric acid in an amount sufficient to convert the phosphorous content to a predominantly monocalcium phosphate solution, i.e., a solution having a minor but appreciable quantity of phosphorous present as phosphoric acid. The cost of the acid used is an important consideration as respects the economic feasibility of the process; it follows also that the amount of the acid used is an important factor in the cost. The phosphate constituent of phosphate rock is predominantly tri-calcium phosphate. The reaction between the tri-calcium phosphate and sulfuric acid may be looked upon as a successive addition of acid to phosphate. The addition of one hydrogen ion per phosphate radical to the tri-calcium phosphate would result in the formation of di-calcium phosphate, the addition of two hydrogen ions per phosphate would give mono-calcium phosphate and the addition of three hydrogen ions results in phosphoric acid. The theoretical sulfuric acid requirements per unit of phosphorous pentoxide to produce various phosphates from tri-calcium phosphate are as follows:

| Product: | Pounds $H_2SO_4$ required per unit $P_2O_5$ |
|---|---|
| Phosphoric acid | 41.5 |
| Mono-calcium phosphate | 27.8 |
| Di-calcium phosphate | 13.9 |

This provides an indication of the amount of sulfuric acid required to produce the various phosphates.

While the cost of sulfuric acid necessary for the standard sulfuric acid process is not prohibitive when used on a commercial grade ore containing around 31% phosphorous pentoxide, it is prohibitive for low grade-low phosphate ores existing in quantities in various parts of the country having a $P_2O_5$ content of around 21%.

The above emphasizes the importance of developing a method for producing usable phosphates from low-grade phosphate ore, which is cheaper than a process utilizing sulfuric acid. A method which has been extensively tested in the past involves the use of sulfurous acid in the leaching step to dissolve the tri-calcium phosphate in the phosphate ore. Past attempts to use this acid have been economically unsuccessful mainly because the production of usable phosphate involves the addition of prohibitively high cost materials and no feasible expedient was available for the reuse of the sulfurous acid or the sulfur dioxide from which it was made, and no economically feasible method was available for separating the usable phosphate from the other components of the solution formed by the reaction of sulfurous acid on the tri-calcium phosphate.

Accordingly, it is an object of this invention to provide an economically feasible method for producing usable phosphates from phosphate ores, in which sulfurous acid is used as the leaching agent.

It is another object of this invention to provide a method for recovering usable phosphates from low-grade phosphate ore utilizing sulfurous acid as the leaching agent in which the sulfur dioxide used to form the sulfurous acid can be recovered and cycled for reuse in the process.

It is another object of this invention to provide a process for recovering usable phosphates from low-grade phosphate ore in which sulfur dioxide is used as the leaching agent to form sulfites and phosphates in solution which can be separated and isolated and the sulfur dioxide recovered from the sulfite for reuse in the process.

The above objects are accomplished by the method of this invention which, for the purposes of explanation, can be considered to comprise three steps, namely, a leaching step, a separation step and a sulfur dioxide recovery step. In the preferred modification of the leaching step, sulfur dioxide is bubbled through a water slurry of the ore at a 15:1 dilution for 24 hours at a temperature of 4° centigrade and a pH of about 1 to form a solution which is essentially mono-calcium phosphate and calcium bi-sulfite. Alternatively, dilutions of at least 5:1 of ore to slurry may be used accompanied by successive extractions. In the separation step, the usable phosphate in the form of phosphoric acid is separated by solvent extraction by means of an organic solvent or other conventional process. The sulfite remaining after removal of the phosphate is recovered by conventional methods and heated to recover sulfur dioxide for reuse in the process in accordance with well known procedures.

The following reaction is postulated as occurring in the reaction between phosphate ore and sulfurous acid:

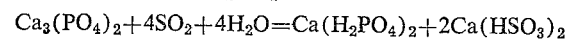

The $Ca(HSO_3)_2$ is broken down with heat as follows:

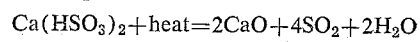

By recycling the sulfur dioxide for reuse, it is apparent that reagent consumption is reduced to a minimum.

The invention is illustrated by the treatment of Wyoming high-lime phosphoria formation rock. The rock is low in phosphate content and high in lime which makes the use of a standard sulfuric acid process for producing phosphoric acid or phosphate fertilizers higher in cost than if a commercial 31% $P_2O_5$ ore were available as a feed. The lime content of the ore, as well as the final form in which the phosphate is produced, determines the net acid consumption. The rock used analyzed 21.2% $P_2O_5$.

As to the leaching step, early experiments established that the phosphate ore is readily attacked by acids even at a low temperature if the pH is low. If the acid which is used to promote this attack also converts the calcium to a compound which can be decomposed by heat, it offers a possibility of cheap recovery of the acid for reuse. An acid which offers this possibility is sulfurous acid. If it is strong enough to attack the phosphate, it should form mono-calcium phosphate or phosphoric acid and at the same time calcium sulfite or calcium bi-sulfite. The sulfite compounds can then be separated from the phosphates and decomposed by heat to form lime and sulfur dioxide which can be recycled for reuse in the process.

In the leaching of the ore with $SO_2$ a slurry of finely ground ore and water is formed and diluted to about 15 parts of water to 1 of ore. The high dilutions were required because it was discovered that there is a limit to the solubility of phosphate in solution in the presence of high concentrations of calcium bi-sulfite. The pH of the solution is maintained at about 1 the temperature at about 4° centigrade and the $SO_2$ is bubbled through the slurry for a period of about 24 hours.

The phosphate from Wyoming ore is relatively easy to dissolve if there is sufficient acid present to hold the pH of the solution down to about 1 and at least below 1.5. The important point in obtaining high leach extraction is to have enough free acid present. Since sulfur dioxide gas in water forms sulfurous acid which is a weak acid, the concentration of sulfur dioxide in solution must be quite high in order to have enough free hydrogen ions to dissolve the phosphate. This high concentration of $SO_2$ is maintained by conducting the process at a low temperature.

The leaching procedure by which the experimental data given in Tables I–VI below was produced is as follows: The ore used as heads for all the sulfur dioxide leaching was the Wyoming high lime content phosphate rock described above. Portions of this ore were ground to 100 mesh size in a pulverizer. The particle size, however, is not critical. Weighed amounts of the finely ground material were mixed with an appropriate amount of distilled water in a 2 liter "resin flask" equipped with a propeller agitator and set in a cold water bath. The temperature of this bath was kept low by mechanical refrigeration. During leaching, gaseous 100% $SO_2$ was bubbled through the pulp via a glass frit at a slow rate. At proper time intervals a sample of the pulp was withdrawn and allowed to settle while maintained at the reduced temperature. A portion of the supernatant liquor was decanted for assay and the rest of the sample returned to the leach slurry. At the completion of leaching, the entire pulp was filtered, washed with water and the solids dried, weighed and analyzed for $P_2O_5$. The filtrate plus wash solution was measured and analyzed for $P_2O_5$. The data from the tests is presented in Tables I–V below:

TABLE I

TEST NO. 1

$SO_2$ Leaching at 5:1 dilution, Room Temperature
Single Stage

CONDITIONS 200 grams of −100 mesh ore
Temperature, 18° C. Dilution, 5:1
Mechanical agitation in 2 liter flask
Agitation time, 39 hours total
$SO_2$ bubbled through pulp continuously

DETAILED LEACH DATA

| Agitation Time, Hours | pH | Solution Assay $P_2O_5$, g.p.l. |
|---|---|---|
| 0 | 8.7 | 0 |
| 1.2 | 1.7 | 4.0 |
| 5 | 1.7 | 7.2 |
| 13 | 1.4 | 8.7 |
| 17 | 1.7 | 10.2 |
| 21 | 1.7 | 10.6 |
| 25 | 1.7 | 11.1 |
| 39 | 1.7 | 10.8 |

RESULTS

| | Weight, Grams | Assay $P_2O_5$ | Distribution of $P_2O_5$, percent |
|---|---|---|---|
| Heads | 200 | 21.5% | |
| Filtrate plus wash | 1,050 | 10.89 g.p.l. | 26.3 |

TABLE II

TEST NO. 2

$SO_2$ Leaching at 10:1 Dilution, Temperature 3° C.
Single Stage

CONDITIONS 100 grams of −100 mesh ore
Temperature, 3° C. Dilution, 10:1
Mechanical agitation in 2 liter flask
Agitation time 48 hours total
$SO_2$ bubbled through pulp continuously

TABLE II—Continued

DETAILED LEACH DATA

| Agitation Time, Hours | pH | Solution Assay $P_2O_5$, g.p.l. |
|---|---|---|
| 0 | | |
| 2.5 | 1.2 | 12.7 |
| 6.0 | 1.0 | 13.7 |
| 9.0 | 1.0 | 14.5 |
| 14.0 | 0.9 | 17.5 |
| 23.0 | 0.9 | |
| 27.0 | 1.0 | 18.3 |
| 31.5 | 1.0 | 18.8 |
| 46.5 | 1.0 | |

RESULTS

| | Weight, Grams | Assay $P_2O_5$ | Distribution of $P_2O_5$, percent |
|---|---|---|---|
| Heads | 200 | 21.5% | |
| Filtrate plus wash | 1,160 | 15.4 g.p.l. | 82.0 |
| Tails | 25.6 | 17.9% | 18.0 |

TABLE III

TEST NO. 3

$SO_2$ Leaching at 15:1 Dilution, Temperature 3° C.
Single Stage

CONDITIONS 66.7 grams of −100 mesh ore
Temperature, 3° C. Dilution 15:1
Mechanical agitation in 2 liter flask
Agitation time 44 hours total
$SO_2$ bubbled through pulp continuously

DETAILED LEACH DATA

| Agitation Time, Hours | pH | Solution Assay $P_2O_5$, g.p.l. |
|---|---|---|
| 0 | | 0 |
| 3.5 | 1.0 | 9.52 |
| 19.0 | 1.4 | 13.35 |
| 23.0 | 1.0 | 13.42 |
| 27.0 | 1.0 | 13.40 |
| 44.0 | 1.0 | |

RESULTS

| | Weight, Grams | Assay $P_2O_5$ | Distribution of $P_2O_5$, percent |
|---|---|---|---|
| Heads | 66.7 | 22.1% | |
| Filtrate plus wash | 1,100 | 13.4 g.p.l. | 98.9 |
| Tails | 13.6 | 1.3% | 1.1 |

TABLE IV

TEST NO. 4

$SO_2$ Leaching at 5:1, Temperature, 3° C.
2 Stages

CONDITIONS 200 grams of −100 mesh ore
Temperature, 3° C. Dilution 5:1
Mechanical agitation in 2 liter flask
Agitation time, first stage 47 hours, second stage 22 hours, 69 hours total
$SO_2$ bubbled through pulp continuously

TABLE IV—Continued
DETAILED LEACH DATA

| Agitation Time, Hours | pH | Solution Assay $P_2O_5$, g.p.l. |
|---|---|---|
| First Stage | | |
| 0.0 | 8.7 | 0 |
| 1.0 | 1.5 | 4.10 |
| 5.5 | 1.8 | 9.91 |
| 9.5 | 1.4 | 9.98 |
| 13.5 | 1.4 | 10.15 |
| 17.5 | 1.4 | 14.68 |
| 21.5 | 1.1 | 17.00 |
| 24.5 | 1.4 | 16.82 |
| 39.0 | 1.4 | 15.32 |
| 47.0 | 1.3 | |
| Second Stage | | |
| 0.0 | | |
| 3.25 | 1.07 | 10.60 |
| 11.00 | 1.00 | 12.20 |
| 21.50 | 1.20 | |

RESULTS

| | Weight Assay | Assay $P_2O_5$ | Distribution of $P_2O_5$ | |
|---|---|---|---|---|
| | | | Percent | Cum. Percent |
| Heads | 200 | 21.5% | | |
| Filtrate plus wash #1 | 1,250 | 19.2 g.p.l. | 56.2 | |
| Filtrate plus wash #2 | 1,165 | 14.3 g.p.l. | 39.4 | 95.6 |
| Tails | 43.8 | 4.4% | 4.4 | |

TABLE V
TEST NO. 5

$SO_2$ Leaching at 5:1 Dilution, Temperature, 3° C. Three Stages

CONDITIONS 200 grams of −100 mesh ore
Temperature, 3° C. Dilution 5:1
Mechanical agitation in a 2 liter flask
Agitation time stage 1, 48 hours, stage 2, 44 hours, stage 3, 24 hours, total 116 hours
$SO_2$ bubbled through pulp continuously

DETAILED LEACH DATA

| Agitation Time, Hours | pH | Solution Assay $P_2O_5$, g.p.l. |
|---|---|---|
| First Stage | | |
| 0 | 8.5 | |
| 2.5 | 1.4 | 14.1 |
| 6.0 | 1.2 | 17.1 |
| 9.0 | 1.0 | 17.6 |
| 14.0 | 1.0 | 18.2 |
| 23.0 | 0.9 | 20.9 |
| 27.0 | 1.0 | |
| 31.5 | 1.0 | 19.4 |
| 47.5 | 1.0 | |
| Second Stage | | |
| 0.0 | | 0 |
| 4.0 | 1.0 | 6.82 |
| 20.0 | 1.5 | 11.75 |
| 24.0 | 1.0 | 15.25 |
| 28.0 | 1.0 | 15.25 |
| 29.0 | 1.0 | 15.50 |
| 44.0 | 1.0 | |
| Third Stage | | |
| 0 | | |
| 4.5 | 1.3 | 0.27 |
| 7.5 | 1.1 | 0.27 |
| 23.25 | 1.1 | |

TABLE V—Continued
RESULTS

| | Weight Grams | Assay $P_2O_5$ | Distribution of $P_2O_5$ | |
|---|---|---|---|---|
| | | | Percent | Cum. Percent |
| Heads (Assayed) | | 22.1% | | |
| Heads (Calculated) | 200 | 19.4% | | |
| Filtrate 1st stage | 1,050 | 17.7 g.p.l. | 48.0 | |
| Filtrate 2d stage | 1,420 | 15.6 g.p.l. | ¹ 50.6 | 98.6 |
| Filtrate 3d stage | 1,000 | .4 g.p.l. | 1.1 | 99.7 |
| Tails 1st stage | | 20.1% | | |
| Tails 2d stage | | 1.7% | | |
| Final Tails | 38 | .3% | .3 | |

¹ Calculated on assumption that $P_2O_5$ in the solid sample from 1st stage would have contributed its contained $P_2O_5$ during 2d stage leaching.

The following Table VI gives a summary of the $SO_2$ leach tests:

TABLE VI.—SUMMARY OF $SO_2$ LEACH TESTS

| Test No. | Dilution per Stage | No. of Stages | Extraction, Percent |
|---|---|---|---|
| 1 | 5:1 | 1 | 26.3 |
| 2 | 10:1 | 1 | 82.0 |
| 3 | 15:1 | 1 | 98.9 |
| 4 | 5:1 | 2 | 95.9 |
| 5 | 5:1 | 3 | 99.6 |

The test for which results are shown in Table I was made at room temperature and at a 5:1 dilution. The extraction of phosphate in solution (26.3%) was so low that it was not considered necessary even to analyze the solid tails. This test indicated that there was a limiting solubility of phosphate in solution which affected the extraction. The tests of Tables II and III were performed at low temperature with successively higher dilution. Since the extraction increased from 82% at 10:1 dilution to 98.9% at 15:1 dilution, it was obvious that the concentration of phosphate in solution is a controlling factor in leach extraction. This is an important feature of the invention. The 15:1 dilution for the tests of Table III provided the most effective leach extraction. The results of Tables IV and V show that successive extractions at low dilutions have results comparable to a single stage leach at higher dilutions. In the tests producing the results of Table IV, two successive 5:1 dilution leaches gave a 95.9% extraction (compared with 82% for a single stage leach at a 10:1 dilution). In the test giving the test results of Table V, three successive 5:1 leaches gave 99.6% extraction compared to 98.9% for a single stage at 15:1 dilution.

As the results tabulated illustrate, for the high lime content ore a large ratio of water to ore or a large volume of solution is required to keep the phosphate dissolved. This condition is achieved by leaching at a ratio of water to ore of 10 or more to 1, or by successive leaches starting with lower ratios of water to ore. The ratio of water to ore in the final leach to achieve a high recovery must be 10 or more of water to 1 of ore. The above tests established that sulfur dioxide treatment of phosphate ores under the above conditions dissolves essentially all the phosphate from its ores and is a commercially feasible process.

The leaching step, of course, is not restricted to the specific type ore used for the above tests but may be used for lower or higher grade ore.

However, the invention provides a commercially feasible process for recovery of over 98% of phosphate values from high lime content ores in which the $P_2O_5$ content is less than about 30%. As stated above there was no commercially feasible process for recovery of phosphate from these high lime content ores prior to this invention. The following is an assay of Wyoming phosphate ore (Stambaugh Creek sample), the type ore used for the tests set forth herein:

*Assays*

| | Percent |
|---|---|
| $P_2O_5$ | 22.4 |
| CaO | 42.1 |
| F | 1.4 |
| $CO_2$ | 8.1 |
| $SiO_2$ | 16.9 |
| $Al_2O_3$ | 2.4 |
| $Fe_2O_3$ | 1.5 |
| MgO | 1.2 |
| $SO_3$ | 2.2 |
| L.O.I. (1000° C.) | 9.5 |
| Insol | 16.7 |
| $U_3O_8$ | 0.02 |
| $V_2O_5$ | 0.004 |
| Mo | nil |

*Calculated composition*

| | Percent |
|---|---|
| $Ca_3(PO_4)_2$ | 49.0 |
| $CaF_2$ | 2.9 |
| $SiO_2$ | 16.9 |
| $CaCO_3$ | 21.0 |
| $CaSO_4$ | 3.8 |
| $MgCO_3$ | 2.6 |
| $Al_2O_3$ | 2.4 |
| $Fe_2O_3$ | 1.5 |
| Water and organic | 1.4 |

The preferred concentration range for the slurry is 10 or more parts of water to 1 of ore by weight. The pH value of the solution must be less than about 1.5. The temperature at which the sulfurous acid is reacted with the slurry is preferably from just above the freezing point of the solution up to about 10° C. The freezing point of the solution would always be below 0° C.

The solution formed by the reaction of sulfurous acid on the ore contains essentially mono-calcium phosphate and calcium bi-sulfite as solutes with lesser amounts of other phosphates and sulfites. The method contemplates the separation of the phosphates and sulfites in such a way as to produce a relatively pure phosphate product and calcium sulfite. Calcium sulfite is then roasted to liberate sulfur dioxide for recycling to the leaching circuit. The two components can be separated by crystallization using techniques well known in the art. A crystallization process for the separation of the sulfite and phosphate components of the leach solution is disclosed in U.S. Patent 2,899,271. Solvent extraction tests are briefly described below which indicate that the phosphate values can be separated as $H_3PO_4$ by this method also; with refinement the method might be commercially feasible.

It is well known that there are many organic liquids, immiscible in water, which will dissolve phosphoric acid. Accordingly, to use these liquids it is necessary to convert the phosphates present to $H_3PO_4$. If the leach solution is kept at a high concentration of sulfurous acid, the calcium phosphate salt is converted to phosphoric acid.

Five organic liquids were tested by batch extractions of pure phosphoric acid solution and their distribution coefficients determined. The results of these tests are set forth in Table VII below. The distribution constant, indicated by $K_a°$, is defined as $K_a° =$ gm. $H_3PO_4$ per liter of organic phase divided by grams of $H_3PO_4$ per liter of aqueous phase. In performing the test, 100 milliliters of the solvents were equilibrated with 100 ml. of a .5 molar (49.2 g.p.l.) $H_3PO_4$ solution in a cylindrical graduated separatory funnel. The mixture was agitated vigorously with a mechanical stirrer for ten minutes and allowed to separate into two phases. The volume of each phase was measured and the phosphoric acid remaining in the aqueous phase was titrated with standardized sodium hydroxide and the concentration of each phase calculated. The resulting data as well as the distribution coefficient for each solvent at the particular phosphoric acid concentration is given in Table VII:

TABLE VII.—SCREENING TEST

[Extraction of $H_3PO_4$ from .5 M $H_3PO_4$ solution]

| | Volume of— | | $H_3PO_4$ in— | | $K_a°$ |
|---|---|---|---|---|---|
| | Organic | Aqueous | Organic | Aqueous | |
| N-butanol | 111 | 89 | 6.48 | 47.2 | 0.14 |
| N-amyl Alcohol | 104 | 96 | 1.15 | 49.0 | 0.02 |
| 2-octanol | 100 | 100 | 0 | 49.3 | 0 |
| tri-Butyl Phosphate | 108 | 92 | 5.74 | 47.1 | 0.12 |
| tri-Capryl Amine (10% in kerosene) | 103 | 97 | 17.6 | 37.3 | 0.47 |

It is noted from Table VII that the distribution coefficients of N-amyl alcohol and 2-octanol are too low to justify their use for commercial application.

The distribution constants of the other three show that they can be used for the extraction of phosphoric acid from pure phosphoric acid solutions. Further tests of normal butyl alcohol as a solvent showed that the presence of sulfurous acid in relatively high concentrations did not noticeably interfere with the extraction of phosphoric acid although significant amounts of $SO_2$ were adsorbed by the solvent. It appears, therefore, that the solvent extraction method, with proper refinement, might offer attractive possibilities for commercial adaptation in separating the phosphate values as $H_3PO_4$ from the leach solution.

The calcium sulfite remaining in the aqueous phase after solvent extraction of $H_3PO_4$ by whatever method is used can be recovered by evaporation and crystallization by well known techniques. It is then decomposed by roasting into calcium oxide and sulfur dioxide, the latter being returned to the leaching circuit for treatment of fresh ore. Accordingly, the overall process of recovering calcium values from high lime content ores can be used either as a batch process or as a continuous process.

It is thus seen that the invention provides a novel process for the recovery of usable phosphates from high lime content ores having a phosphate content based on $P_2O_5$ as low as 21.2%. The improved leaching step in the process, as described herein, effecting over 99% solution of ore phosphate is a significant contribution to the commercial feasibility of the overall process.

Although the invention has been illustrated and described with reference to the preferred embodiments thereof, it is to be understood that it is in no way limited to the details of such embodiments, but is capable of numerous modifications within the scope of the appended claims.

What is claimed is:

1. The process for recovering phosphate values from phosphate ores which comprises: forming a water slurry of the ore in which the ratio of water to ore by weight is greater than about 10 parts of water to 1 part of ore, leaching the slurry at a temperature between the freezing temperature of the slurry and about 10° C. with concentrated sulphur dioxide at a pH between about 1 and 1.5 to maintain the leach solution at a high concentration of sulfurous acid and form a solution containing calcium sulphites, calcium phosphates and phosphoric acid, recovering sulphur dioxide from the sulphites and recycling it for reuse in the process, and selectively removing the sulphites, phosphates and phosphoric acid from the slurry.

2. The process of claim 1 in which the step of recovering and recycling sulphur dioxide is performed after selectively removing the phosphates and phosphoric acid from the slurry.

3. The process of claim 1 in which the ratio of water to ore in said slurry is about 15 to 1 by weight and the temperature of the slurry during leaching is maintained at about 4° C.

4. The process of claim 1 in which the ratio of water to ore in the final slurry is achieved by starting at a ratio of water to ore of about 5 to 1 followed by successive extractions of the leach solution to result in a total cumulative ratio of water to ore by weight greater than about 10 to 1.

5. The process of claim 1 in which a high concentration of sulphurous acid formed by the $SO_2$ treatment is maintained in the slurry to convert at least a portion of the phosphates to phosphoric acid, and the phosphoric acid is separated from the sulphites in the solution by solvent extraction.

6. The process of claim 1 in which the phosphates are selectively removed from the slurry by crystallization.

7. The process of claim 1 in which the phosphate content of the ore based on $P_2O_5$ is less than about 30 percent.

8. In the process for recovering phosphate values from phosphate ores in which the leaching is performed by introduction of sulfur dioxide into the slurry of water and ore to form sulfurous acid and the formed phosphoric acid and phosphates are selectively removed from the slurry, the improvement which comprises forming a slurry in which the ratio of water to ore is at least about 10 parts of water to 1 part of ore by weight, maintaining the pH of the slurry between about 1 and 1.5 during the leaching by the introduction of sulfur dioxide, and maintaining the temperature of the slurry during leaching between the freezing point of the slurry and about 10° C. to form calcium sulphites, calcium phosphates and phosphoric acid.

9. The process of claim 1 in which the recovered sulphites are heated to produce sulphur dioxide, and the sulphur dioxide recovered is recycled for reuse in the process.

10. The process of claim 4 in which the phosphoric acid is recovered by solvent extraction with an extractant selected from the group consisting of N-butanol, tri-butyl phosphate and tri-capryl amine.

11. A process for recovering phosphoric acid from high lime content ores of calcium phosphates having a $P_2O_5$ content between about 20 to 30 percent, which comprises: forming a water slurry of the ore in which the ratio of water to ore by weight is from about 10:1 to about 15:1, leaching the slurry at a temperature between the freezing point of the slurry and about 4° C. with concentrated sulfur dioxide at a pH between about 1 and about 1.5 to maintain the leach solution at a high concentration of sulfurous acid and form calcium sulfites and phosphoric acid, extracting the phosphoric acid from the slurry by solvent extraction with a substantially water immiscible organic extractant medium, concentrating the slurry by heating it, roasting the formed concentrate of calcium sulfites to produce sulfur dioxide, and recycling the sulfur dioxide for reuse in the process, whereby about 98 percent of the original $P_2O_5$ content of the ore is recovered and a portion of the sulfur dioxide necessary for the leaching step is conserved.

References Cited
UNITED STATES PATENTS

| | | | |
|---|---|---|---|
| 450,243 | 4/1891 | Lisenberg | 23—189 X |
| 1,137,806 | 5/1915 | Stewart | 23—109 |
| 1,251,741 | 1/1918 | Blumenberg | 23—109 |

OSCAR R. VERTIZ, *Primary Examiner.*

L. A. MARSH, O. F. CRUTCHFIELD,

*Assistant Examiners.*